United States Patent
Lamoureux

(10) Patent No.: US 12,176,142 B2
(45) Date of Patent: Dec. 24, 2024

(54) MAGNETIC ATTACHMENT DEVICE

(71) Applicant: A. RAYMOND ET CIE, Grenoble (FR)

(72) Inventor: David Lamoureux, Grenoble (FR)

(73) Assignee: A. RAYMOND ET CIE, Grenoble (FR)

( * ) Notice: Subject to any disclaimer, the term of this patent is extended or adjusted under 35 U.S.C. 154(b) by 386 days.

(21) Appl. No.: 17/652,375

(22) Filed: Feb. 24, 2022

(65) Prior Publication Data

US 2022/0277875 A1 Sep. 1, 2022

(30) Foreign Application Priority Data

Feb. 26, 2021 (FR) ...................................... 2101890

(51) Int. Cl.
*H01F 7/02* (2006.01)
(52) U.S. Cl.
CPC .................................. *H01F 7/0252* (2013.01)
(58) Field of Classification Search
CPC .... H01F 7/0252; H01F 7/0236; H01F 7/0221; B60N 3/102; B60R 11/00; B60R 2011/0057
See application file for complete search history.

(56) References Cited

U.S. PATENT DOCUMENTS

| | | | |
|---|---|---|---|
| 6,282,760 B1 * | 9/2001 | Mars | A44B 9/16 24/303 |
| 6,305,656 B1 * | 10/2001 | Wemyss | B60R 11/0241 220/628 |
| 9,997,286 B2 * | 6/2018 | Herman | H01F 7/20 |
| 10,292,514 B1 * | 5/2019 | Kuhn | B60N 3/103 |
| 10,308,155 B1 | 6/2019 | Cline | |
| 2012/0326819 A1 * | 12/2012 | Malanczyj | H01F 7/04 335/295 |

FOREIGN PATENT DOCUMENTS

| | | | | |
|---|---|---|---|---|
| EP | 2427072 | | 3/2018 | |
| GB | 2453110 A | * | 4/2009 | ............. B60R 11/00 |
| WO | 0049919 | | 8/2000 | |
| WO | WO-0049919 A1 | * | 8/2000 | ......... A47G 23/0216 |

OTHER PUBLICATIONS

French search report issued in FR2101890 dated Oct. 19, 2021.

* cited by examiner

*Primary Examiner* — Mohamad A Musleh
(74) *Attorney, Agent, or Firm* — Perman & Green, LLP

(57) ABSTRACT

A magnetic attachment system including a magnetic attachment base and an item to be retained having engagement means, the base including a first and a second retaining means which are capable of moving back and forth between a locked position and an unlocked position, in the locked position the retaining means being capable of being received in the engagement means, where the first retaining means includes a first motion magnet (140), and the second retaining means includes a second motion magnet, the item to be retained includes two contact magnets, the contact magnets exert a force on the motion magnets, which holds the first retaining means and the second retaining means in the engagement means in the locked position.

15 Claims, 6 Drawing Sheets

[Fig. 1]
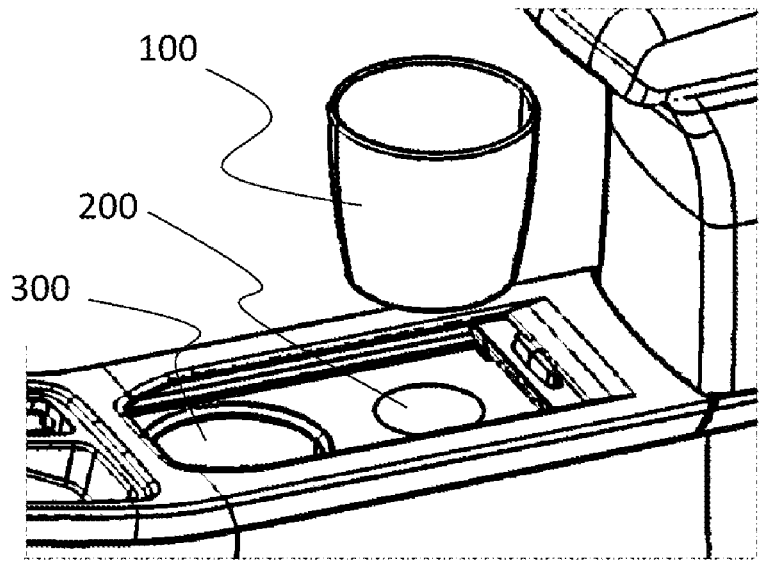
[Fig. 2]
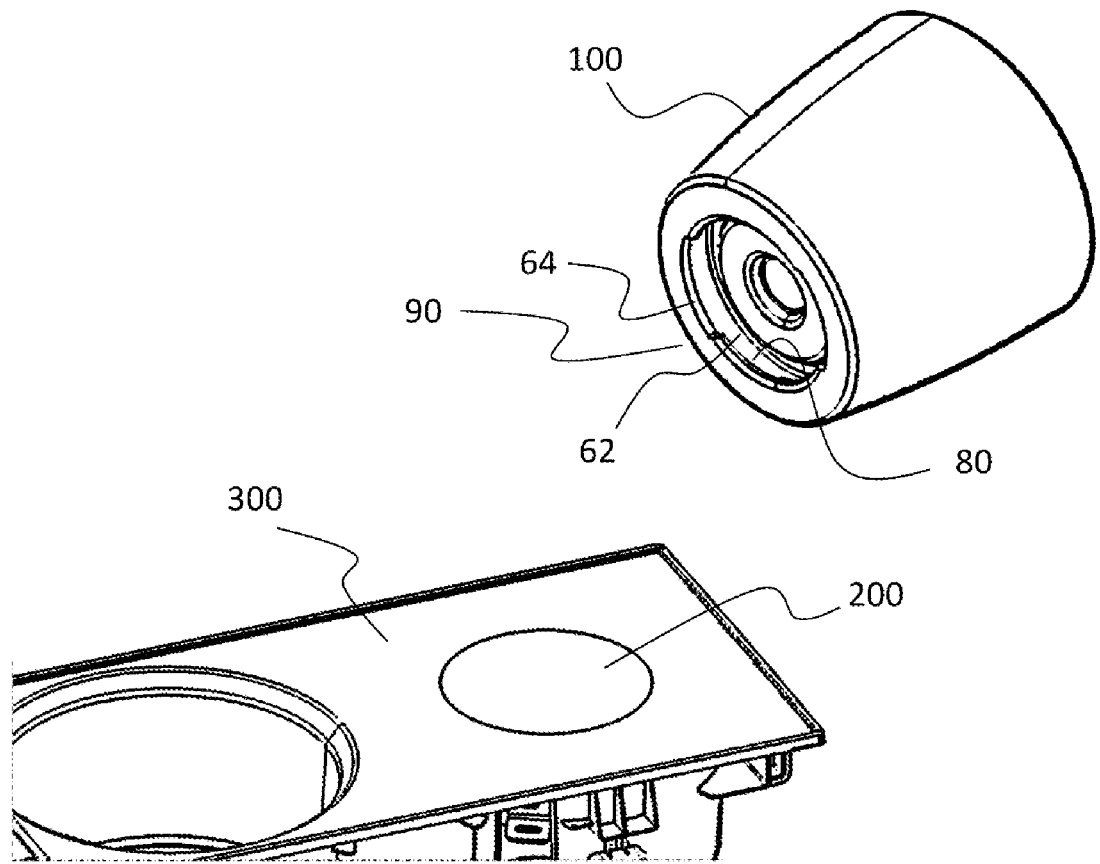

[Fig. 3A]
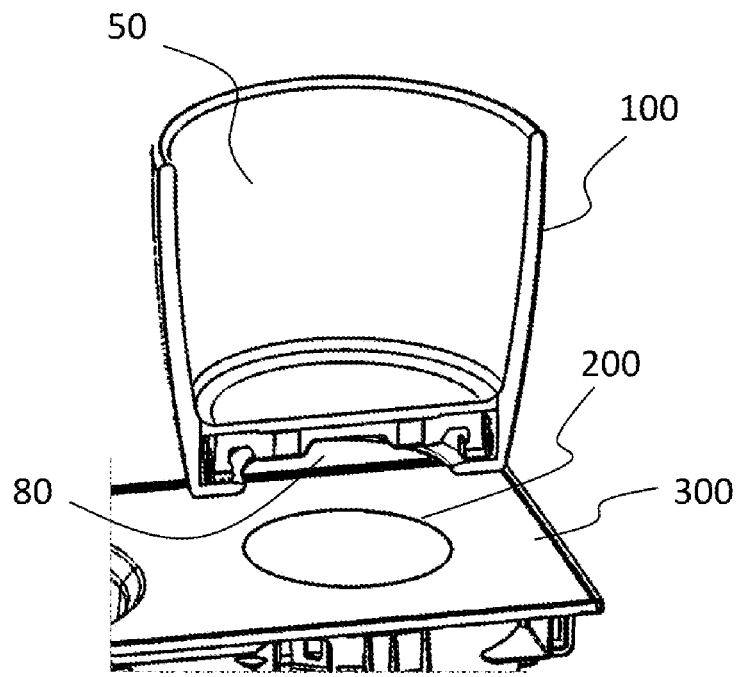
[Fig. 3B]
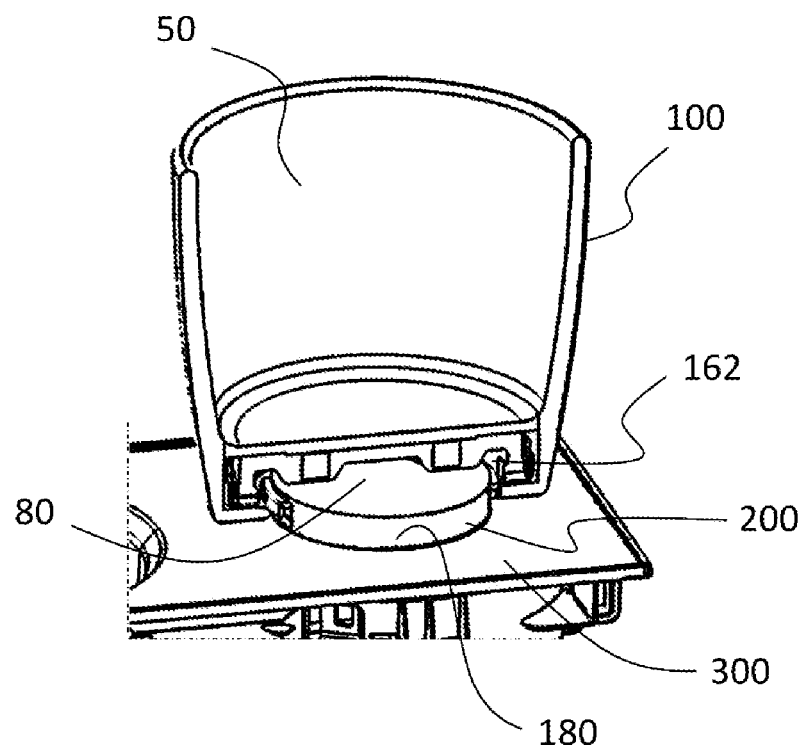

[Fig. 3C]
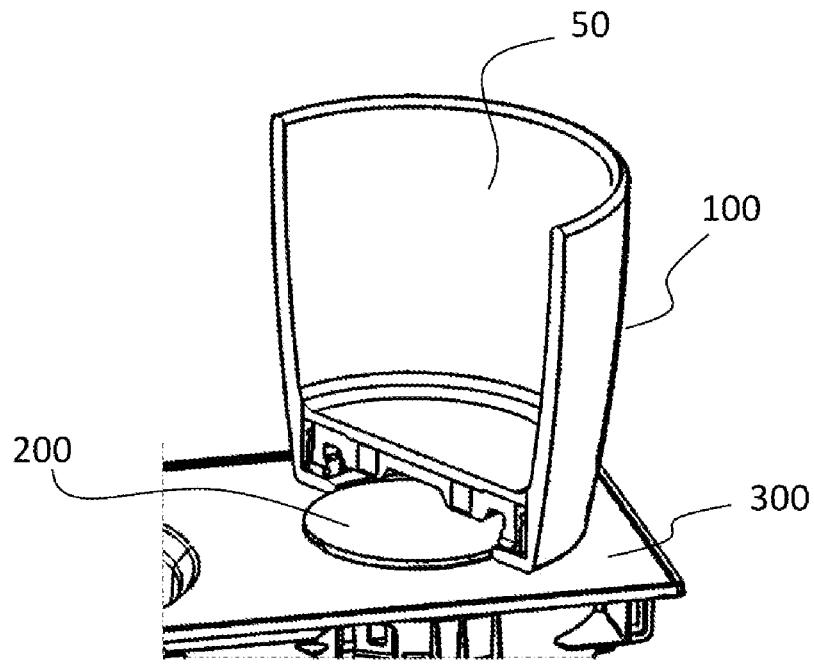
[Fig. 4]
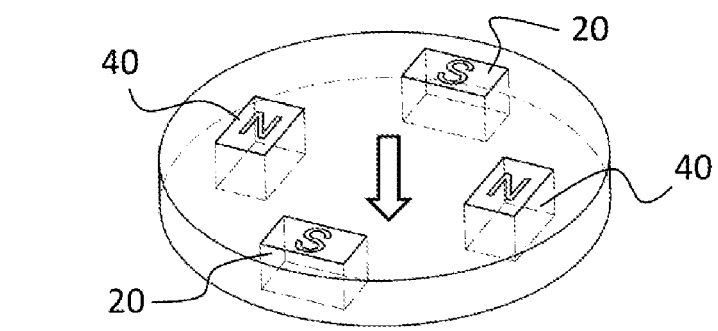
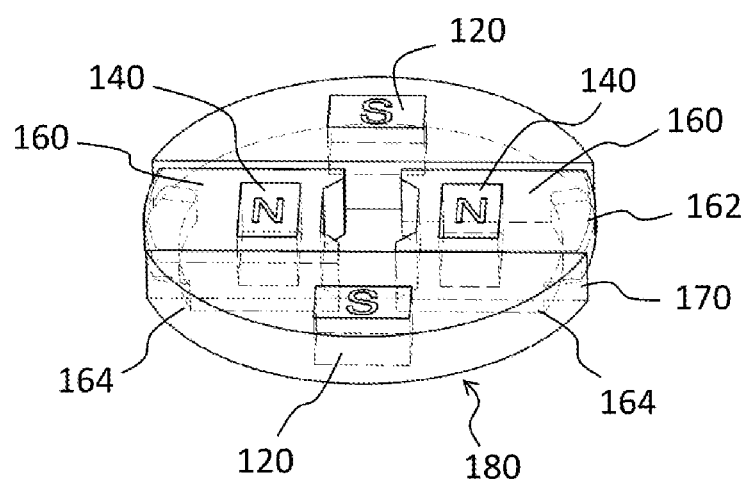

[Fig. 5A]
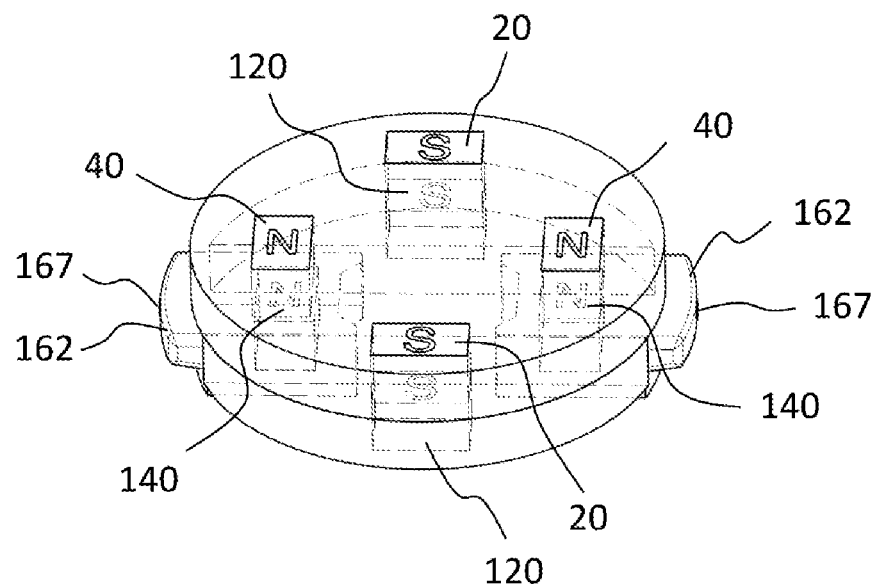
[Fig. 5B]
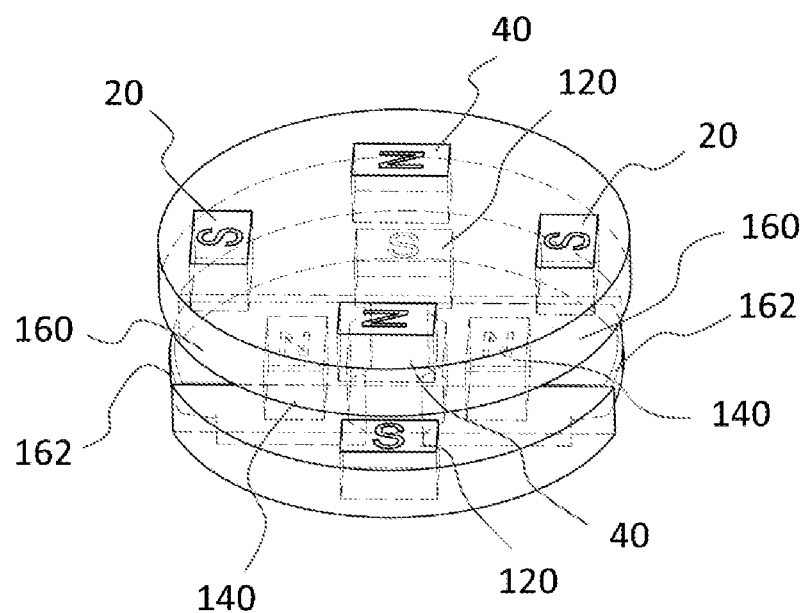

[Fig. 6]
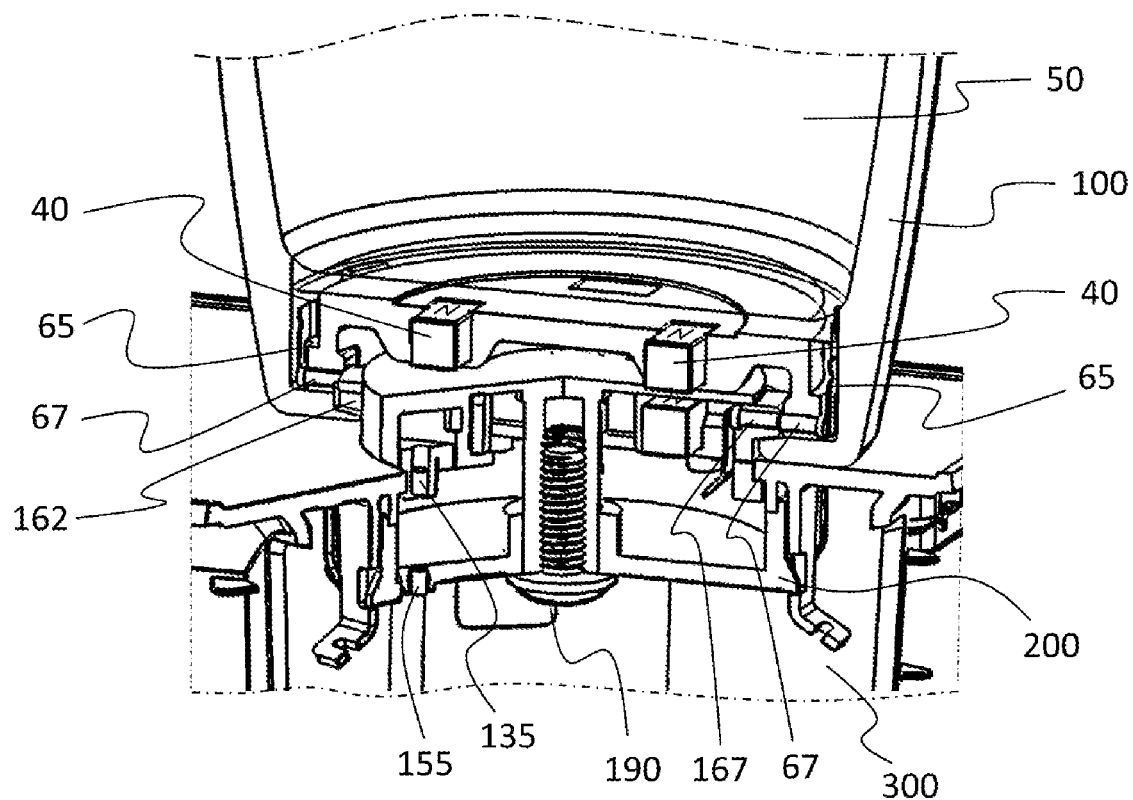
[Fig. 7]
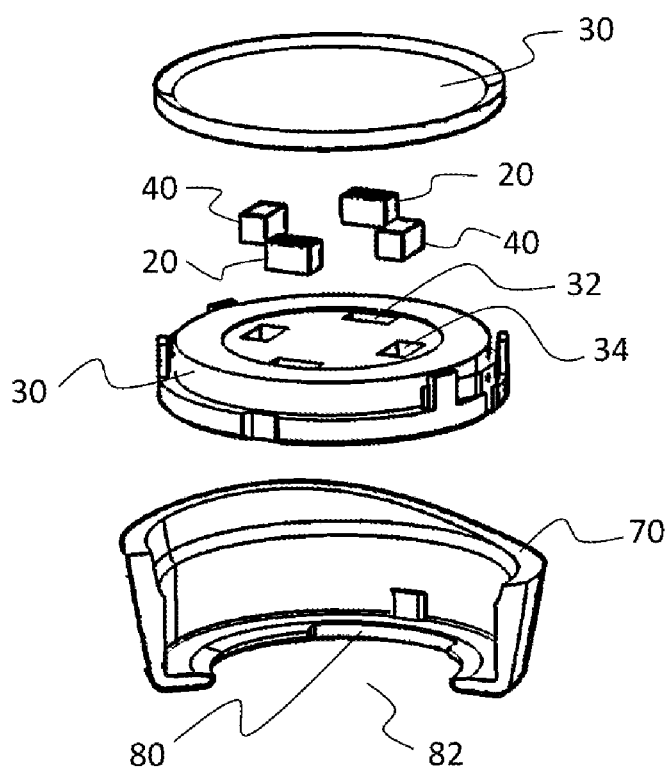

[Fig. 8]
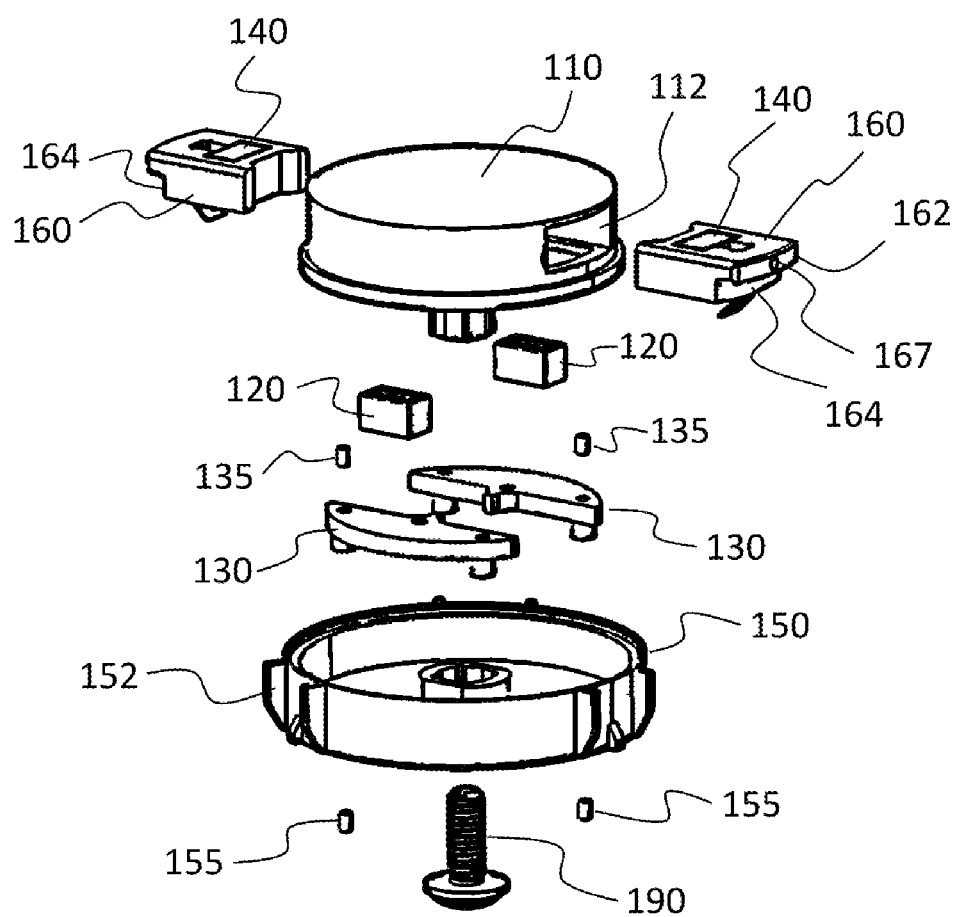

MAGNETIC ATTACHMENT DEVICE

CROSS-REFERENCE TO RELATED APPLICATIONS

This application claims priority to and the benefit of French patent application number FR2101890 filed on Feb. 26, 2021, the disclosure of which is incorporated herein by reference in its entirety.

BACKGROUND

1. Field

The present disclosure relates to a magnetic attachment device, in particular to an attachment system including an attachment base and an item to be attached, and more particularly to the attachment base and the item to be attached and which are provided with magnets. For example, a cup accessory and an attachment hatch form a system according to the present disclosure. The present disclosure further relates to an attachment base intended to be used in the attachment system.

2. Brief Description of Related Developments

The magnetic locking/unlocking mechanism is used in locks. This implementation is known from the prior art in the magnetic security tag hook/remover.

The European patent No. 2427072 describes a magnetic lock with two magnets that exert an attractive force on one another in order to lock.

SUMMARY

The present disclosure provides a magnetic attachment device that allows an item to be attached to a structure while ensuring simple assembly and/or disassembly.

A first aspect of the present disclosure relates to a magnetic attachment system including a magnetic attachment base and an item to be retained having engagement means, the base including at least a first and a second retaining means which are capable of moving back and forth between a locked position and an unlocked position, in the locked position the retaining means being capable of being received in the engagement means, wherein,
 the first retaining means includes at least one first motion magnet, and the second retaining means includes a second motion magnet,
 the item to be retained includes at least two contact magnets,
 the contact magnets exert a force on the motion magnets, which holds the first retaining means and the second retaining means in the engagement means in the locked position.

The present disclosure is advantageously implemented according to the embodiments and alternative embodiments described hereinbelow, which can be considered singly or according to any combinations technically possible.

In one embodiment, the attachment system has the following features:
 the first retaining means and the second retaining means are prevented from rotating by a groove.

In one embodiment, the attachment system has the following features:
 the item to be retained includes an attachment interface comprising a recess, and the engagement means take on the form of a groove,
 in the locked position, the attachment base is received in the recess, and the first and second retaining means serving as attachment detents engage in the groove.

In one embodiment, the attachment system has the following features:
 the attachment base includes two first magnets, the south poles whereof point in the same direction as the north pole of the motion magnets, the two first magnets and the two motion magnets being disposed rotationally and alternately in a plane,
 the item to be retained includes two second magnets,
 the two first magnets being arranged such that they exert an attractive force on the two second magnets in the locked position.

In one embodiment, the contact magnets and the second magnets are rotationally and alternately disposed on a magnet holder.

In one embodiment, the attachment system in the locked position can be transformed by a relative rotational displacement between the attachment base and the item to be retained into the unlocked position, wherein
 the two second magnets exert a force on the motion magnets, which releases the first and second retaining means in the engagement means,
 the contact magnets exert a repulsive force on the two first magnets.

In one embodiment, the rotational displacement is a 90-degree displacement.

In one embodiment, the attachment base and the item to be retained respectively include electrical contacts, the contacts being electrically connected in the locked position.

In one embodiment, the item to be retained is a cup accessory, such as a cup holder.

Another aspect of the present disclosure relates to a vehicle comprising an attachment system.

Another aspect of the present disclosure relates to a magnetic attachment base intended to retain an item having engagement means, the base including a first and a second retaining means which are capable of moving back and forth between a locked position and an unlocked position, in the locked position the retaining means being capable of being received in the engagement means of the item. The first retaining means includes a first motion magnet, the second retaining means includes a second motion magnet, and in the presence of a magnetic force on each of the motion magnets, the first retaining means and the second retaining means move apart from one another and are expelled into the locked position.

In one embodiment, the first retaining means and the second retaining means are prevented from rotating by a translational groove.

In one embodiment, the attachment base includes two first magnets, the south poles whereof point in the same direction as the north pole of the motion magnets, the two first magnets and the two motion magnets being disposed rotationally and alternately.

In one embodiment, the attachment base can be arranged in the form of a retractable hatch in a structure, such as a centre console support.

In one embodiment, the attachment base includes non-return means, such as non-return magnets, for holding the attachment base in a retracted position.

Another aspect of the present disclosure relates to a vehicle comprising a magnetic attachment base.

Advantageously, the motion magnets of the base allow the item to be retained to be attached in the presence of a magnetic force on these magnets, thus facilitating assembly/disassembly. The first magnets of the attachment base make it retractable under the effect of a magnetic force. The presence of magnets in the item which are arranged to be coupled with the magnets of the attachment base procures the necessary magnetic forces. The fact that a simple rotation is sufficient to uncouple the magnets from these two parts is particularly advantageous for disassembling the item to be retained.

BRIEF DESCRIPTION OF THE FIGURES

FIG. 1 shows a view of a magnetic attachment system including an attachment base and an item to be retained, where the attachment base is arranged in the form of a retractable hatch in a car centre console support;

FIG. 2 shows a perspective view of a magnetic attachment system in FIG. 1, where the item must be attached to the attachment base which is in a retracted state;

FIG. 3A shows a view of a magnetic attachment system in FIG. 2, where the item to be retained, shown via a sectional view, is approaching the attachment base;

FIG. 3B shows a view of a magnetic attachment system in FIG. 2 in the locked position, where the item to be retained, shown via a sectional view, is attached to the attachment base;

FIG. 3C shows a view of a magnetic attachment system in FIG. 2 in the unlocked position, where the item to be retained, shown via a sectional view, is rotated by an angle relative to the position shown in FIG. 3B;

FIG. 4 shows an arrangement of the magnets of the magnetic attachment base and an arrangement of the magnets of the item to be retained according to one embodiment;

FIG. 5A shows an arrangement of the magnets of the magnetic attachment base and an arrangement of the magnets of the item to be retained in FIG. 4 when the magnetic attachment system is in the locked position;

FIG. 5B shows an arrangement of the magnets of the magnetic attachment base and an arrangement of the magnets of the item to be retained in FIG. 4 when the magnetic attachment system is in the unlocked position;

FIG. 6 shows a partial, sectional view of the magnetic attachment system in the locked position according to one embodiment;

FIG. 7 shows an exploded view of an item to be retained according to one embodiment;

FIG. 8 shows an exploded view of a magnetic attachment base according to one embodiment.

DETAILED DESCRIPTION

The different figures and the elements of the same figure are not necessarily shown to the same scale. Identical elements bear the same reference numerals in all figures.

The terminology used in the present description must in no case be interpreted in a limiting or restrictive manner, simply because it is used in conjunction with a detailed description of certain embodiments of the present disclosure.

FIG. 1 shows a view of a magnetic attachment system consisting essentially of an attachment base 200 and an item 100 to be retained. It is shown in FIG. 1 that the attachment base 200 is arranged in the form of a hatch that can be retracted into a structure 300 such as a car centre console support. By way of example only, the item 100 to be retained is a cup accessory, such as a cup holder. Other items to be retained, such as lamps, are also provided for by the present disclosure. The item to be retained 100 can be electrically connected to the attachment base 200, as shown in FIG. 6, which will be described in detail hereinbelow. The structure 300 is provided with a housing to receive the removable hatch 200. In the retracted state, the entire hatch 200 is received inside the housing.

FIG. 2 shows a perspective view of a magnetic attachment system according to the present disclosure, where the attachment base is in the retracted state wherein the entire removable hatch 200 is received inside the housing. In one embodiment, the hatch 200 in the retracted state has an upper surface forming part of the surface of the structure 300. The item 100 to be retained is provided with an attachment interface 90 by which the item 100 can be mounted to the attachment base which projects from the housing. In one embodiment, the attachment interface 90 includes a recess 80 and the engagement means 62. Preferably, the engagement means 62 take on the form of a groove. The attachment base 200 is received in the recess 80 when the item 100 is locked to the base, as shown in FIG. 3B which will be described in detail hereinbelow.

FIG. 3A shows a view of a magnetic attachment system as the item 100 to be retained, shown via a sectional view, approaches the attachment base 200. Before covering the hatch 200 for the item 100, the recess 80 is placed facing the upper surface of the hatch 200 which is in the retracted state. The hatch 200 and the item 100 to be retained are respectively provided with the first magnets 120 and the second magnets 20. When the item 100 with the recess 80 facing the hatch 200 is oriented in a determined direction, the second magnets 20 exert an attractive force on the two first magnets 120, allowing the hatch 200 to come out of the housing. Said determined direction, which depends on the arrangement of the first magnets 120 and of the second magnets 20, can be indicated on the item to be retained 100. In one embodiment, the first magnets 120 and the second magnets 20 are arranged such that the second magnets 20 exert a force on the first magnets 120, the item 100 having a tendency to place itself in said determined direction as a result of this force.

Preferably, the upper surface of the hatch 200 is circular.

The hatch 200 includes a first and a second retaining means 160 which are capable of moving back and forth between a first position and a second position. In the first position, the attachment base 200 can be received in the recess 80 and the retaining means 160 can be received in the engagement means 62. FIG. 3B shows a view of a magnetic attachment system in the locked position, where the item to be retained, shown via a sectional view, is attached to the attachment base. In the first position, the first and second retaining means 160 acting as attachment detents engage in the groove 62. The protruding parts 162 of the retaining means 160 are engaged in the groove, thereby locking the item 100.

The first retaining means 160 and the second retaining means 160 respectively include a first motion magnet 140 and a second motion magnet 140. The item 100 to be retained includes two contact magnets 40. The contact magnets 40 exert a force on the motion magnets 140, which holds the first retaining means 160 and the second retaining means 160 in the engagement means 62 in the locked position. Before the engagement of the retaining means 160 and the groove 62, the contact magnets 40 begin to exert a force on the motion magnets 140 and thus on the retaining means 160. Under the effect of this magnetic force, the retaining means 160 are displaced and protrude from the hatch 200.

In one embodiment, the first and second retaining means 160 are prevented from rotating by a translational groove 170 along which the retaining means 160 are capable of moving back and forth.

In the locked position shown in FIG. 3B, the item 100 is locked in the axial direction. However, the item 100 can be displaced in a rotational manner by the effect of torque.

FIG. 3C shows a view of a magnetic attachment system in the unlocked position, where the item to be retained is rotated by an angle relative to the position shown in FIG. 3B. Following a rotation from the locked position, for example by 90 degrees, the two second magnets 20 exert a force on the motion magnets 140, allowing the retaining means 160 to be displaced to the second position wherein the retaining means 160 do not protrude from the hatch 200, so that the first and second retaining means 160 are removed from the groove 62. In the second position, the contact magnets 40 exert a repulsive force on the two first magnets 120, which repels the hatch 200 into its retracted position in the structure 300. At the same time, the force that the two second magnets 20 exert on the motion magnets 140 contributes to this repelling effect.

FIG. 4 shows an arrangement of the magnets of the magnetic attachment base and an arrangement of the magnets of the item to be retained according to one embodiment. In the embodiment shown, the south poles of the two first magnets 120 of the attachment base 200 point in substantially the same direction, whereas the north poles of the motion magnets 140 point in substantially the same direction as the latter. The two first magnets 120 and the two motion magnets 140 are disposed rotationally and alternately, for example in a plane. The two first magnets 120 are disposed in an opposite manner in the plane. In a preferred embodiment, these magnets 120, 140 are disposed at equal angular distances. Preferably, the two motion magnets 140 are housed in two cavities in the retaining means 160. Advantageously, the retaining means 160 can be driven by a magnetic force exerted on the two motion magnets 140.

In one embodiment, the retaining means 160 include limiting members 164 which abut against the attachment base 200 when the retaining means 160 protrude.

The item 100 to be retained includes two second magnets 20 and two contact magnets 40. The contact magnets 40 and the second magnets 20 are disposed rotationally and alternately, such that the contact magnets 40 and the second magnets 20 are opposite one another respectively. The four magnets 20, 40 are preferably in the same plane, for example disposed on a magnet holder. In a preferred embodiment, the second magnets 20 are arranged symmetrically relative to the axis connecting the contact magnets 40. The four magnets 20, 40 are preferably disposed at equal angular distances.

As the item 100 to be retained approaches the attachment base 200, the magnets 20, 40 are displaced in the direction of the arrow shown.

FIG. 5A shows the arrangement of the magnets of the magnetic attachment base 200 and of the magnets of the item 100 to be retained when the magnetic attachment system is in the locked position. It should be noted that the magnets 20, 40 of the item 100 to be retained are in their attractive force position, i.e. the second magnets 20 exert an attractive force on two first magnets 120 of the hatch 200, which allows the hatch to be displaced towards the item 100 and out of its retracted state, and at the same time, the contact magnets 40 exert an attractive force on the motion magnets 140 of the retaining means 160, which causes the protruding parts serving as detents 162 to appear. The detents 162 engage in the groove 62 of the item 100 (not shown), thereby attaching the item 100 to the base 200, with the magnetic forces between the magnets of the item 100 and the base 200 reinforcing this attachment.

In one embodiment, each detent 162 advantageously includes an electrical element 167 such as an electrical copper terminal for producing the electrical contact. In the locked position, these terminals come into contact with electrical connection elements provided at the engagement means 62 of the item 100 to be retained, advantageously allowing an electrical connection to be made between the item to be retained and the attachment base.

FIG. 5B shows an arrangement of the magnets of the magnetic attachment base 200 and an arrangement of the magnets of the item 100 to be retained, after the item 100 to be retained in FIG. 5A has been rotated by ¼ turn relative to the attachment base 200, with the magnetic attachment system being in the unlocked position. The second magnets 20 take the position of the contact magnets 40 in FIG. 5A. As the north poles of the magnets 40 are facing in a direction opposite that for the magnets 20, the latter exert a repulsive force on the motion magnets 140 which are located beneath the magnets 20 in this position, which causes a translational displacement of the retaining means 160 in the groove 170 such that the retaining means 160 retract and do not protrude. At the same time, the contact magnets 40 located above the two first magnets 120 exert a repulsive force on the first magnets 120, which repels the attachment base 200 downwards and into its retracted state. At the same time, the force that the two second magnets 20 exert on the motion magnets 140 contributes to this repelling effect.

FIG. 6 shows a partial, sectional view of the magnetic attachment system in the locked position according to one embodiment. Advantageously, the item 100 to be retained comprises two opposing electrical elements 67, such as two electrical terminals connected to an electrical circuit of the item 100, which are arranged in the engagement means 62. In the locked position, the electrical element 167 of each detent 162 comes into contact with an electrical element 67, thereby establishing an electrical connection between the item 100 to be retained and the attachment base 200. In one embodiment, the attachment base further includes holding magnets 135, 155 which are arranged to hold the base 200 retracted inside the housing of the structure 300.

FIG. 7 shows an exploded view of an item 100 to be retained according to one embodiment. The item 100 to be retained essentially includes a body 70, and a magnet holder 30 which includes arrangements such as the cavities 32, 34 for containing the second magnets 20 and the contact magnets 40. The body 70 includes an attachment interface 90 including a recess 80 and an opening 82 through which the attachment base can be inserted for attachment. The magnet holder 30 is located above the recess 80. The item 100 to be retained further includes a cover 30 which is intended to enclose the magnets 20, 40 in the cavities 32, 34.

FIG. 8 shows an exploded view of a magnetic retractable hatch 200 according to one embodiment. The hatch 200 essentially includes an encasing body with two side openings 112, two retaining means 160, the first magnets 120, and the motion magnets 140. The encasing body essentially consists of a removable upper part 110 having the side openings 112 and a cradle 150. Preferably, the two elements 110 and 112 are assembled by a screw 190. The two retaining means 160 are capable of moving back and forth in a translational groove 112 within the encasing body, the outer ends 162 of the two retaining means 160 being able to protrude from the encasing body and form detents through the side openings 112. The two retaining means 160 each comprise a motion magnet 140. The first magnets 120 are held opposite one another by a magnet holding plate 130 inside the encasing body. The retractable hatch 200 is provided with means to prevent the rotation of the holding plate and thus of the first magnets 120 relative to the encasing body. Preferably, the non-return magnets 135, 155 are provided for this purpose. The retaining plate includes cavities for containing the first non-return magnets 135 which are coupled with the second non-return magnets 155 attached to the outside of the encasing body, for example on an outer surface of the cradle 150.

The present disclosure relates as a whole to a magnetic attachment base 200 intended to retain an item 100 having engagement means 62 such as the cup holder in FIG. 7. The base 200 includes a first and a second retaining means 160 which are capable of moving back and forth between a locked position and an unlocked position, in the locked position the retaining means 160 being capable of being received in the engagement means 62 of the item 100. The first retaining means 160 includes a first motion magnet 140, and the second retaining means 160 includes a second motion magnet 140. In the presence of a magnetic force on each of the motion magnets 140, the first retaining means 160 and the second retaining means 160 move apart from one another and are expelled into the locked position.

In certain embodiments, the first retaining means 160 and the second retaining means 160 are prevented from rotating by a translational groove 170.

In certain embodiments, the attachment base 200 includes two first magnets 120, the south poles whereof point in the same direction as the north pole of the motion magnets 140. The two first magnets 120 and the two motion magnets 140 are disposed rotationally and alternately.

In certain embodiments, the attachment base 200 includes non-return means, such as non-return magnets 135, for holding the base 200 retracted inside the housing of the structure 300.

Generally speaking, the magnets used in this present disclosure can be permanent magnets made of a ferromagnetic material.

LIST OF REFERENCES

TABLE 1

| References | Designations |
|---|---|
| 100 | Item to be retained; Cup accessory |
| 20 | Second magnet |
| 30 | Cover |
| 32 | Cavity |
| 34 | Cavity |
| 40 | Contact magnet |
| 62 | Engagement means; Groove |
| 67 | Electrical terminal |
| 200 | Attachment base; Retractable hatch |
| 110 | Removable upper part |
| 112 | Side opening |
| 120 | First magnet |
| 130 | Magnet holding plate |
| 135 | First non-return magnet |
| 140 | Motion magnet |
| 150 | Cradle |
| 155 | Second non-return magnet |
| 160 | Retaining means |

TABLE 1-continued

| References | Designations |
|---|---|
| 162 | Attachment detent |
| 164 | Abutment |
| 167 | Electrical terminal |
| 170 | Groove |
| 190 | Attachment screws |
| 300 | Structure; Centre console support |

What is claimed is:

1. A magnetic attachment system including a magnetic attachment base and an item to be retained having engagement means, the base including at least a first and a second retaining means which are capable of moving back and forth between a locked position and an unlocked position, in the locked position the retaining means being capable of being received in the engagement means, characterised in that the first retaining means includes at least one first motion magnet, and the second retaining means includes a second motion magnet, the item to be retained includes at least two contact magnets, the contact magnets exert a force on the motion magnets, which holds the first retaining means and the second retaining means in the engagement means in the locked position.

2. The magnetic attachment system according to claim 1, characterised in that the first retaining means and the second retaining means are prevented from rotating by a translational groove.

3. The magnetic attachment system according to claim 1, characterised in that the item to be retained includes an attachment interface comprising a recess, and the engagement means take on the form of a groove, in the locked position, the attachment base is received in the recess, and the first and second retaining means serving as attachment detents engage in the groove.

4. The magnetic attachment system according to claim 3, characterised in that the attachment base includes two first magnets, the south poles of the two first magnets and the north poles of the motion magnets pointing in the same direction, the two first magnets and the two motion magnets being disposed rotationally and alternately in a plane, the item to be retained includes two second magnets, the two first magnets being arranged such that they exert an attractive force on the two second magnets in the locked position.

5. The magnetic attachment system according to claim 4, characterised in that the contact magnets and the second magnets are rotationally and alternately disposed on a magnet holder.

6. The magnetic attachment system according to claim 2, characterised in that the attachment system in the locked position can be transformed into the unlocked position by a relative rotational displacement between the attachment base and the item to be retained, the two second magnets exert a force on the motion magnets, which releases the first and second retaining means in the engagement means, the contact magnets exert a repulsive force on the two first magnets.

7. The magnetic attachment system according to claim 6, characterised in that the rotational displacement is a 90-degree displacement.

8. The magnetic attachment system according to claim 1, characterised in that the attachment base and the item to be retained respectively include electrical contacts, the contacts being electrically connected in the locked position.

9. A magnetic attachment base intended to retain an item having engagement means, the base including a first and a second retaining means which are capable of moving back and forth between a locked position and an unlocked position, in the locked position the retaining means being capable of being received in the engagement means of the item, characterised in that the first retaining means includes a first motion magnet, the second retaining means includes a second motion magnet, and in the presence of a magnetic force on each of the motion magnets, the first retaining means and the second retaining means move apart from one another and are expelled into the locked position.

10. The magnetic attachment base according to claim 9, characterised in that the first retaining means and the second retaining means are prevented from rotating by a translational groove.

11. The magnetic attachment base according to claim 9, characterised in that the attachment base includes two first magnets, the south poles of the two first magnets and the north poles of the motion magnets pointing in the same direction, the two first magnets and the two motion magnets being disposed rotationally and alternately.

12. The magnetic attachment base according to claim 9, characterised in that the attachment base can be arranged in the form of a retractable hatch in a structure, such as a center console support.

13. The magnetic attachment base according to claim 12, characterised in that the attachment base includes non-return means, such as non-return magnets, for holding the hatch in a retracted position.

14. A vehicle comprising an attachment system according to claim 1.

15. A vehicle comprising a magnetic attachment base according to claim 9.

* * * * *